United States Patent
Schuld

(10) Patent No.: US 8,739,969 B2
(45) Date of Patent: Jun. 3, 2014

(54) FOLDING COMPARTMENTED BOX

(71) Applicant: Reinhard Schuld, Lorch (DE)

(72) Inventor: Reinhard Schuld, Lorch (DE)

(73) Assignee: Boehringer Ingelheim Pharma GmbH & Co. KG, Ingelheim am Rhein (DE)

( * ) Notice: Subject to any disclaimer, the term of this patent is extended or adjusted under 35 U.S.C. 154(b) by 0 days.

(21) Appl. No.: 13/753,716

(22) Filed: Jan. 30, 2013

(65) Prior Publication Data

US 2013/0140351 A1  Jun. 6, 2013

Related U.S. Application Data

(63) Continuation of application No. 13/128,587, filed as application No. PCT/EP2009/064969 on Nov. 11, 2009, now abandoned.

(30) Foreign Application Priority Data

Nov. 21, 2008 (DE) .................... 20 2008 015 493 U

(51) Int. Cl.
  *B65D 25/04* (2006.01)
  *B65D 85/10* (2006.01)
  *B65D 43/16* (2006.01)

(52) U.S. Cl.
  USPC .... 206/232; 206/268; 229/120.18; 229/160.1

(58) Field of Classification Search
  USPC ................. 206/268, 273, 38, 38.1, 232, 256;
              229/120.05, 120.18, 160.1
  See application file for complete search history.

(56) References Cited

U.S. PATENT DOCUMENTS

| | | | | |
|---|---|---|---|---|
| 306,620 A * | 10/1884 | Jaeger | ...................... | 229/120.18 |
| 1,556,514 A * | 10/1925 | Feldman | .................. | 229/120.18 |
| 2,617,578 A * | 11/1952 | Fischer | .......................... | 206/256 |
| 3,039,671 A * | 6/1962 | Chiamardas | .................. | 206/256 |
| 4,134,495 A * | 1/1979 | Friedman | ...................... | 206/232 |
| 5,277,304 A * | 1/1994 | Brizzi et al. | .................. | 206/256 |
| 5,361,898 A * | 11/1994 | Gottlieb | ........................ | 206/232 |
| 5,439,105 A * | 8/1995 | Focke | ........................... | 206/268 |
| 5,513,748 A * | 5/1996 | Focke et al. | .................... | 206/268 |

(Continued)

FOREIGN PATENT DOCUMENTS

| DE | 9421160 | 5/1995 |
|---|---|---|
| DE | 19741481 A1 | 3/1999 |

(Continued)

OTHER PUBLICATIONS

International Search Report, Form PCT/ISA/210, for corresponding PCT/EP2009/064969; date of mailing: Feb. 24, 2010.

(Continued)

*Primary Examiner* — Bryon Gehman
(74) *Attorney, Agent, or Firm* — Michael P. Morris; Mary-Ellen M. Devlin

(57) ABSTRACT

The invention relates to a folding box made from a one-piece cardboard blank (28) comprising an integrally formed hinged lid (7) that overlaps an upper end area of a rectangular-cuboid-shaped body (1) on three sides, is connected to a rear wall (5) of the body (1) through a fold line (6), and lies flush on a front wall (4) and two side walls (3) in the closed state, and having a front panel (9) and two side panels (10) that form a collar (11) that protrudes into the hinged lid (7), wherein the front panel (9) is arranged parallel to and at a distance from the front wall (4) and divides the body (1) into a main compartment (12) and a front compartment (13).

10 Claims, 3 Drawing Sheets

(56) References Cited

U.S. PATENT DOCUMENTS

Figure 1:
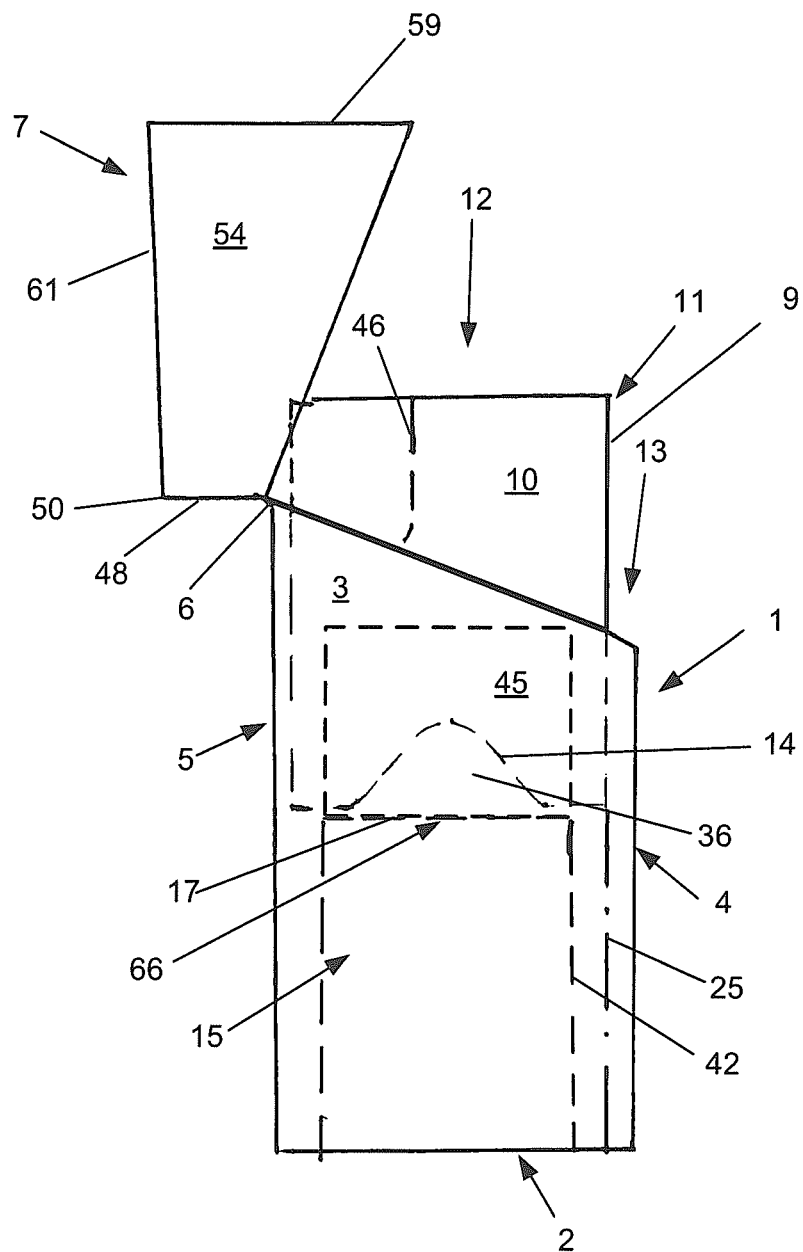

| | | | |
|---|---|---|---|
| 5,513,752 A * | 5/1996 | Gottlieb | 206/232 |
| 5,586,648 A * | 12/1996 | Focke et al. | 206/268 |
| 6,311,834 B1 | 11/2001 | Focke et al. | |
| 6,702,108 B2 * | 3/2004 | Lo Duca | 206/232 |
| 6,913,140 B2 * | 7/2005 | Lo Duca | 206/232 |
| 6,923,366 B2 * | 8/2005 | Lo Duca | 229/120.18 |
| 7,726,549 B2 | 6/2010 | Lo Duca | |
| 2007/0261980 A1 * | 11/2007 | Cox et al. | 206/438 |
| 2011/0303740 A1 | 12/2011 | Schuld | |
| 2013/0140351 A1 | 6/2013 | Schuld | |

FOREIGN PATENT DOCUMENTS

| | | |
|---|---|---|
| EP | 1826129 A2 | 8/2007 |
| GB | 2276611 | 10/1994 |
| JP | 04-016123 | 2/1992 |
| JP | 04-121221 | 10/1992 |
| JP | 3051658 U | 9/1998 |
| JP | 2008254795 A | 10/2008 |
| WO | 9523740 A1 | 9/1995 |
| WO | 2010057812 A1 | 5/2010 |

OTHER PUBLICATIONS

Abstract in English of JP04-016123, 1992.
Abstract in English of JP04-121221, 1992.
Abstract in English of JP2008254795, 2008.
Abstract in English of JP3051658, 1998.

* cited by examiner

FOLDING COMPARTMENTED BOX

The invention relates to a folding box made from a one-piece cardboard blank comprising an integrally formed hinged lid that overlaps an upper end area of a rectangular-cuboid-shaped body on three sides, is connected to a rear wall of the body through a fold line, and lies flush on a front wall and two side walls in the closed state, and having a front panel and two side panels that form a collar that protrudes into the hinged lid.

DE 20 2004 000 479 U1 discloses a folding box made of cardboard comprising an integrally formed hinged lid that overlaps an upper end area of the folding box body on three sides, is connected to one of the areas of the body along a fold line that forms an upper edge of the folding box and has three cohesive panels that protrude perpendicularly from a lid area of the hinged lid and are each of double-walled construction, the hinged lid comprising a tab area bent inwards at the free edge of the respective panel area, which is glued to the inside of the panel area and extends into the throat between the panel area and the lid area and in the throat is integrally connected to the upper edge of the body area partly covered by this panel area in the unopened state of the folding box along a fold line that can be broken open when the hinged lid is opened for the first time.

Moreover, DE 91 14 927 U1 discloses a folding box with a hinged lid made from a cardboard blank with folds and cuts that determine the cuboid shape and define the hinged lid. On the front of the box opposite the folding hinge of the hinged lid and on the adjoining short sides of the box, a tear strip formed by perforations is provided in the cardboard blank, which is made wider on one short side of the folding box to form a gripping handle.

The known folding boxes have various disadvantages in that they do not comprise a plurality of compartments for objects that are to be housed therein, which is a problem particularly in the sector of folding boxes for packaging medicaments which are obliged to contain, in addition to the actual product, namely the medicament, at least one so-called package leaflet. As a rule, this package leaflet is housed together with the product in the body of the folding box. Certain national requirements may demand that two package leaflets be housed in one folding box, one leaflet being intended for the user of the product and the other leaflet being intended for a doctor or pharmacist dispensing the product. If both leaflets together with the product are stored in the body of the folding box, the doctor or pharmacist has to look for the leaflet that is intended for him, which is impractical and time-consuming.

The problem of the invention is to provide a folding box of the kind mentioned hereinbefore which allows the ordered storage of a number of different items.

According to the invention the problem is solved in that the front panel is arranged parallel to and at a distance from the front wall and divides the body into a main compartment and a front compartment.

Thanks to this feature, different items can be housed separately from one another in the main compartment and the front compartment. The items may be intended for example for different user groups at which the folding box and its contents are aimed. For example, a patient will find in the main compartment a medicament and a package leaflet directed at them, and a pharmacist or doctor dispensing the folding box to the patient will find in the front compartment the package leaflet intended for them, which they can easily remove from the folding box without laborious searching. In this context it is also possible for example to provide the main compartment with a seal so as to provide a guarantee that it has not yet been opened. Therefore, the pharmacist in particular can open the folding box to get at the corresponding leaflet, while the main compartment remains sealed, so that the end user can see that the medicament has not been tampered with and is present in its entirety.

According to one feature, the front wall merges into one of the side walls under two directly adjacent longitudinal fold lines, one fold line forming a longitudinal edge, produce a kind of accordion effect. In the event of a compressive load acting on the front wall, for example, such as may occur when a plurality of folding boxes are stacked, there is a deforming action in the region of the two fold lines and the folding box also gives the appearance to the user of being undamaged.

For greater ease of handling and to assist with the removal of the items stored in the folding box, the front wall and/or the front panel expediently comprise(s) a slot as an entry means.

In order to achieve further separation of the different items that are to be housed in the folding box, the main compartment is advantageously divided into two receiving compartments, more particularly of different sizes. For example, different preparations that are to be combined or an active substance formulation with an associated applicator device can be stored in the receiving chambers.

For one-piece manufacture of the folding box, the cardboard blank is expediently severed in a region of one side panel and part of the front panel of the collar such that the main compartment of the body is subdivided into the two receiving compartments by the boundary wall extending from the front panel to the rear wall.

To ensure that a relatively small item can easily be reached, an intermediate base is preferably inserted in one of the receiving compartments.

According to a further feature, to form the intermediate base the cardboard blank comprises a tongue extending from the underside of the side panel that is hinged to the rear wall along a fold line. Expediently, the tongue extends away from the side panel in a first portion, extends in the direction of the free upper edge of the side panel in a second portion and is guided to the side panel in a third portion, the third portion terminating in a fourth portion that extends parallel to the side panel and is glued thereto. In this embodiment, the first portion forms part of a base of the folding box and the third portion of the tongue forms the intermediate base.

Preferably, an information leaflet, particularly a package leaflet, is removably inserted in the front compartment and/or one receiving compartment of the main compartment. So that the information leaflet is not simply lost, advantageously the information leaflet is removably secured in the front compartment.

In order to achieve ease of handling of the information leaflet, according to one feature the information leaflet is pushed into a sleeve which is glued to the inside of the front wall or the outside of the front panel of the collar, particularly in the cardboard blank itself. Accordingly, the cardboard blank can be processed together with the information leaflet even during the manufacture of the folding box. The information leaflet can be taken out of the sleeve and put back into it, so that the sleeve provides a reliable holder for the information leaflet in the front compartment of the folding box.

Expediently, one receiving compartment of the main compartment is an applicator device, particularly an inhaler, for a medical active substance formulation, while in the other receiving compartment is inserted at least one package, particularly a cartridge, containing the active substance formulation that is to be administered.

Inhalers are known under the brand names HandiHaler®, Spinhaler®, Rotahaler®, Aerolizer®, Flowcaps®, Turbospin®, AIR DPI®, Orbital®, Directhaler® and/or are described in DE 33 45 722, EP 0 591 136, DE 43 18 455, WO 91/02558, FR-A-2 146 202, U.S. Pat. No. 4,069,819, EP 666085, EP 869079, U.S. Pat. No. 3,991,761, WO 99/45987, WO 200051672, Bell, J. Pharm. Sci. 60, 1559 (1971); Cox, Brit. Med. J. 2, 634 (1969). Examples of powder inhalers include single- or multi-dose powder inhalers, particularly the Spinhaler®, Rotahaler®, Aerolizer®, Inhalator®, Handi-Haler®, Diskhaler®, Diskus®, Accuhaler®, Aerohaler®, Eclipse®, Turbohaler®, Turbuhaler®, Easyhaler®, Novolizer®, Clickhaler®, Pulvinal®, Novolizer®, Skye-Haler®, Xcelovair®, Pulvina®, Taifun®, MAGhaler®, Twisthaler® and the Jethaler®.

Moreover, the "Respimat®" nebuliser is sold by Boehringer Ingelheim KG in the form of an inhaler and is illustrated in WO 91/14468 and in WO 97/12687 A1. This aerosol nebuliser is used to propel a liquid pharmaceutical active substance preparation from a rigid container inserted in the aerosol nebuliser, i.e. a cartridge, having an inner bag by means of a piston pump driven by a helical gear to expel the active substance from the inner bag and by means of a spring-operated pressure generator through a microstructured nebuliser nozzle to produce a so-called "soft mist" and spray it out.

Particularly preferred in this context are medicaments that are selected from among the anticholinergics, betamimetics, steroids, phosphodiesterase IV-inhibitors, LTD4-antagonists and EGFR-kinase-inhibitors, antiallergics, ergot alkaloid derivatives, triptans, CGRP-antagonists, phosphodiesterase-V-inhibitors, and combinations of such active substances, e.g. betamimetics plus anticholinergics or betamimetics plus antiallergics. In the case of combinations, at least one of the active substances comprises chemically bound water. Preferably, active substances that contain anticholinergics are used, as monopreparations or in the form of combined preparations.

Preferred in this context are medicaments selected from among anticholinergics, betamimetics, steroids, phosphodiesterase IV-inhibitors, LTD4-antagonists and EGFR-kinase-inhibitors, antiallergics, ergot alkaloid derivatives, triptans, CGRP-antagonists, phosphodiesterase-V-inhibitors, and combinations of such active substances, e.g. betamimetics plus anticholinergics or betamimetics plus antiallergics. In the case of combinations, at least one of the active substances comprises chemically bound water. Preferably, active substances that contain anticholinergics are used, as monopreparations or in the form of combined preparations.

In order to provide visual evidence that the items stored in the folding box have not been tampered with, the hinged lid is expediently attached to the side walls and the front wall along a fold line that can be broken open when the hinged lid is opened for the first time.

It will be understood that the features mentioned above and still to be described hereinafter may be used not only in the particular combination specified but also in other combinations. The scope of the invention is defined only by the claims.

Figure 2:
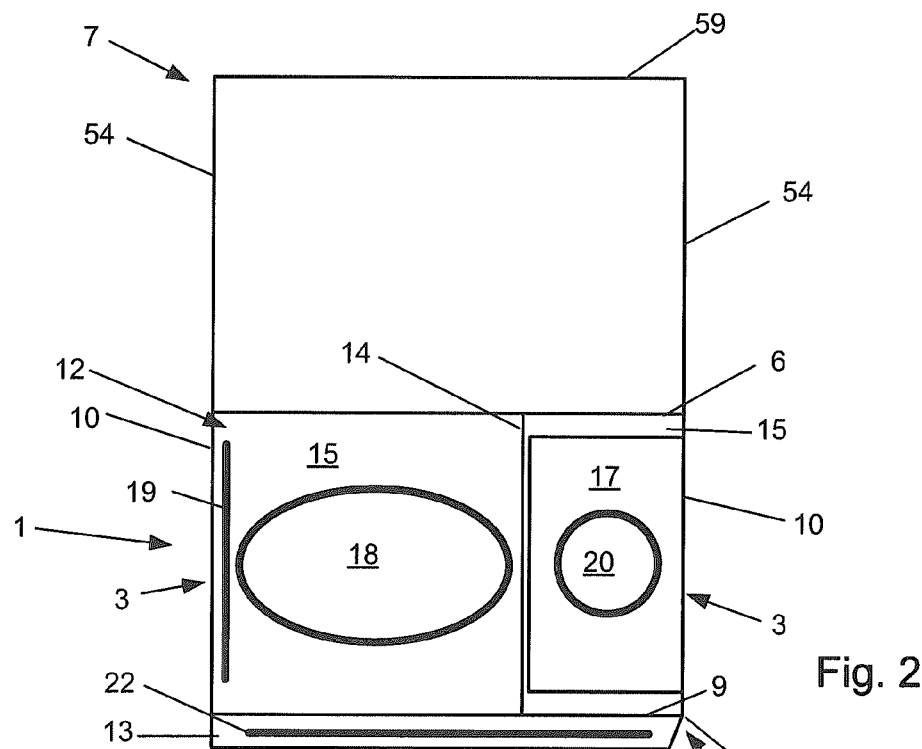
Figure 3:
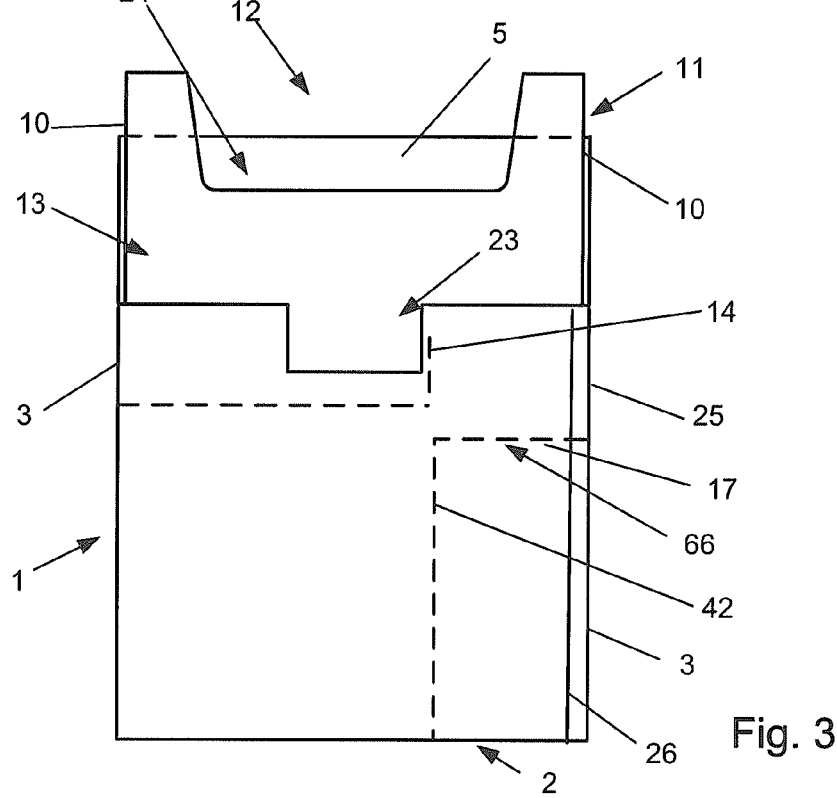
Figure 4:
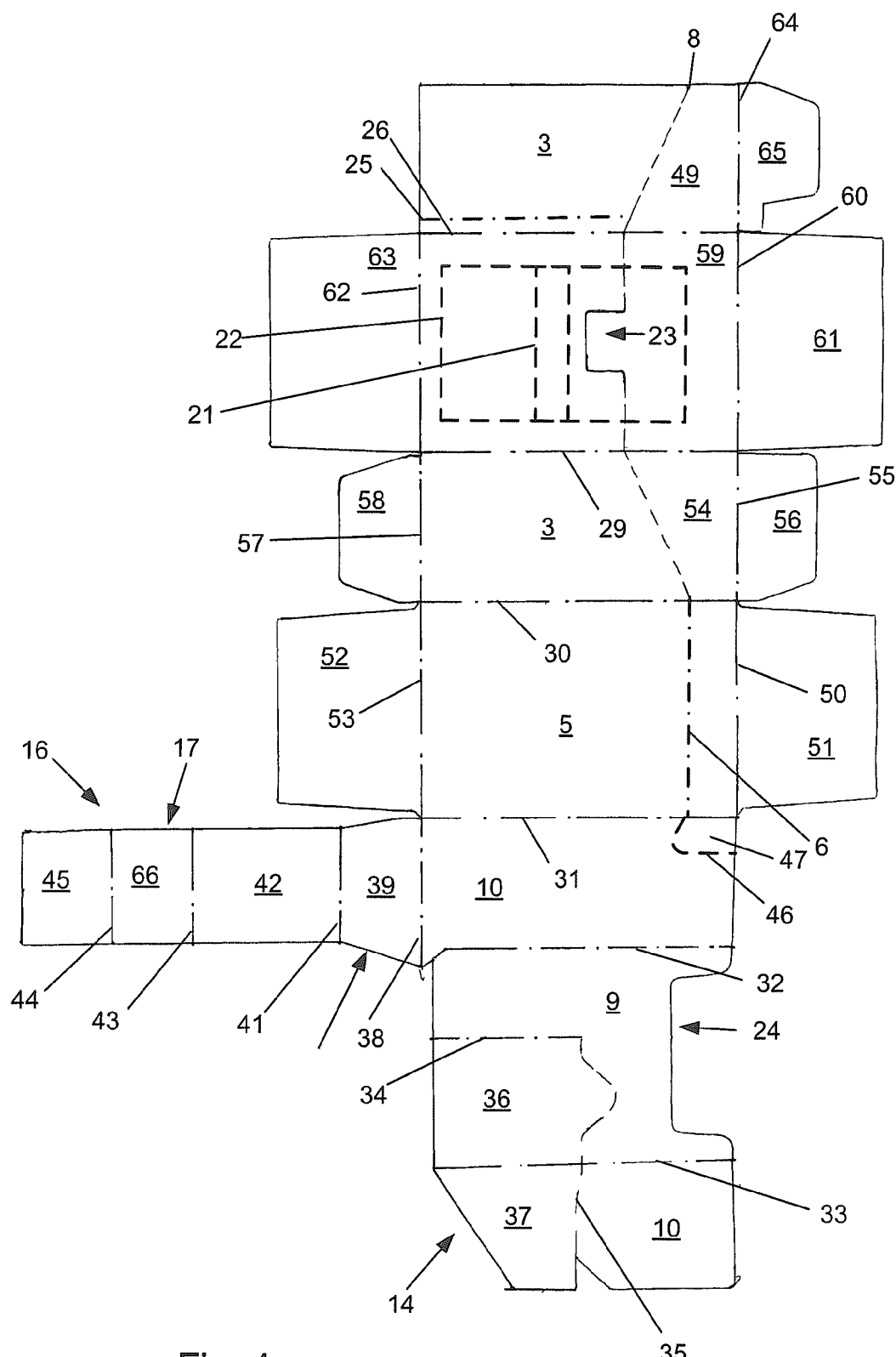

The invention is hereinafter explained in more detail by means of an embodiment by way of example, with reference to the accompanying drawings, wherein:

FIG. 1 shows a side view of a folding box according to the invention with its hinged lid open, FIG. 2 shows a plan view of the folding box according to FIG. 1 with the hinged lid fully opened, FIG. 3 is a front view of the folding box according to FIG. 2 and FIG. 4 shows a cardboard blank for the folding box according to FIG. 1.

The folding box comprises a rectangular-cuboid-shaped body 1 having a base 2, two opposing side walls 3 of a front wall 4 arranged perpendicularly thereto and a rear wall 5 extending parallel thereto, which is connected via a fold line 6 to a hinged lid 7 which in the closed position lies flush on the front wall 4 and the two side walls 3 and is connected to the side walls 3 and the front wall 4 along a fold line, as indicated by the dashed line 8, that can be broken open when the hinged lid 7 is opened for the first time. Projecting into the hinged lid 7 in the closed state of the folding box is a collar 11 made up of a front panel 9 and two opposing side panels 10. The rear wall 5 is constructed higher than the front wall 4 and the side walls 3 extend from the front wall 4 diagonally upwards to the rear wall 5.

The front panel 9 is arranged parallel to and spaced from the front wall 4 and subdivides the body 1 into a main compartment 12 and a front compartment 13, the main compartment 12 being divided into two receiving compartments 15 of different sizes by a partition wall 14 and one receiving compartment 15 comprises an intermediate base 17 formed by a tongue 16.

One receiving compartment 15 of the main compartment 12 stores an inhaler 18 for a medical active substance formulation and a package leaflet 19 intended for a user. On the intermediate base 17 of the other receiving compartment 15 is a cartridge 20 with the active substance formulation that is to be administered using the inhaler. Contained in the front compartment 13 is a second package leaflet 22 held together by a sleeve 21, the sleeve 21 being attached to the inside of the front wall 4 by adhesive bonding.

To open the folding box the user reaches through the slot 23 in the front wall 4 and opens the hinged lid 7 by tearing the tearable fold line along the dashed line 8, which constitutes a perforation, away from the side walls 3 and the front wall 4. The package leaflet 22 can easily be pulled out of the sleeve 21 and the front compartment 13 and removed from the folding box thanks to the slot 23 in the front wall 4 and a slot 24 in the front panel 9.

To avoid deformation of the folding box, particularly in the region of the front wall 4, the front wall merges into the adjacent side wall 3 under two longitudinal fold lines 25, 26 that are directly adjacent to each other. The two fold lines 25, 26, one of which 25 forms a longitudinal edge 27 of the body 1, produce a kind of accordion effect.

For manufacturing the folding box, a one-piece cardboard blank 28 is provided in which the first side wall 3 merges into the front wall 4 at the edges, forming the two fold lines 25, 26, while adjoining the front wall 4 with an intermediate fold line 29 is the second side wall 3, which is in turn connected to the rear wall 5 via a fold line 30. The rear wall 5 is connected to the first side panel 10 of the collar 11 via a fold line 31, the first side panel 10 being coupled to the front panel 9 forming a fold line 32, while the front panel 9 is connected to the second side panel 10 of the collar 11, with a fold line 33 arranged intermediately. The second side panel 10 of the collar 11 and a region of the front panel 9 projecting up to a fold line 34 is severed by a cutting line 35 and forms the boundary wall 14, the first boundary wall portion 36 of which extends from the front panel 9 towards the rear wall 5 and divides the main compartment 12 into the two receiving compartments 15 and the second boundary wall portion 37 of which is glued to the rear wall.

At the base, starting from the first side panel 10 adjoining the rear wall 5, and with the inclusion of a fold line 38, is the tongue 16, the first portion 39 of which forms an inner base tab 40 and merges via a fold line 41 into a second portion 42 extending in the direction of the hinged lid 7, parallel to the boundary wall 14, the second portion 42 merging via a fold line 43 in a third portion 66, namely the intermediate base 17, from which a fourth tongue portion 45 glued to the first side panel 10 above the intermediate base 17 proceeds, with a fold line 44 arranged intermediately. In the region of the first side panel 10 opposite the tongue 16 there is a cutting line 46 for forming a lid tab 47, which is part of a lid rear wall 48 and is glued to a lid side wall 49.

The lid rear wall 48 is connected to the rear wall 5 via the fold line 6 and to the inner lid tab 51 via a fold line 50. Moreover, an inner base tab 52 is coupled to the rear wall 5 by a fold line 53.

Above the line 8, adjoining the second side wall 3 is a lid side wall 54 which is connected to an inner lid tab 56 via a fold line 55. In the lower region, an inner base tab 58 is provided, forming a fold line 57.

On the front wall 3, above the line 8 in the cardboard blank 29 is provided a lid front wall 59 which is connected to an outer lid tab 61 via a fold line 60. Protruding from the opposite side is an outer base tab 63, with a fold line 62 arranged intermediately.

The first side wall 3 is adjacent to the lid side wall 49 above the line 8 in the cardboard blank 29, the lid side wall 49 being connected to an inner lid tab 65 via a fold line 64.

In the folded state the lid tabs 47, 51, 56, 61, 65 and the base tabs 40, 52, 58, 63 are glued to one another. Moreover, the second side panel 10 which is on the outside in the cardboard blank 29 is glued to the inner second side wall 3 and the first side wall 3 which is on the outside in the cardboard blank 29 is glued to the inner first side panel 10.

List of reference numerals

| | | |
|---|---|---|
| 1. | body | |
| 2. | base | |
| 3. | side wall | |
| 4. | front wall | |
| 5. | rear wall | |
| 6. | fold line | |
| 7. | hinged lid | |
| 8. | dashed line | |
| 9. | front panel | |
| 10. | side panel | |
| 11. | collar | |
| 12. | main compartment | |
| 13. | front compartment | |
| 14. | boundary wall | |
| 15. | receiving compartment | |
| 16. | tongue | |
| 17. | intermediate base | |
| 18. | inhaler | |
| 19. | package leaflet | |
| 20. | cartridge | |
| 21. | sleeve | |
| 22. | package leaflet | |
| 23. | slot | |
| 24. | slot | |
| 25. | fold line | |
| 26. | fold line | |
| 27. | longitudinal edge | |
| 28. | cardboard blank | |
| 29. | fold line | |
| 30. | fold line | |
| 31. | fold line | |
| 32. | fold line | |
| 33. | fold line | |
| 34. | fold line | |
| 35. | cutting line | |
| 36. | boundary wall portion | |
| 37. | boundary wall portion | |
| 38. | fold line | |
| 39. | portion | |
| 40. | base tab | |
| 41. | fold line | |
| 42. | portion | |

List of reference numerals -continued

| | | |
|---|---|---|
| 43. | fold line | |
| 44. | fold line | |
| 45. | portion | |
| 46. | cutting line | |
| 47. | lid tab | |
| 48. | lid rear wall | |
| 49. | lid side wall | |
| 50. | fold line | |
| 51. | lid tab | |
| 52. | base tab | |
| 53. | fold line | |
| 54. | lid side wall | |
| 55. | fold line | |
| 56. | lid tab | |
| 57. | fold line | |
| 58. | base tab | |
| 59. | lid front wall | |
| 60. | fold line | |
| 61. | lid tab | |
| 62. | fold line | |
| 63. | base tab | |
| 64. | fold line | |
| 65. | lid tab | |
| 66. | portion | |

What is claimed is:

1. A folding box made from a one-piece cardboard blank (28) comprising:
    an integrally formed hinged lid (7) that: (i) overlaps an upper end area of a cuboid-shaped body (1) on three sides, (ii) is connected to a rear wall (5) of the body (1) via a fold line (6), and (iii) lies flush on a front wall (4) and two side walls of the body (3) in a closed state, and
    a front panel (9) and two side panels (10) that form a collar (11) that protrudes into the hinged lid (7), wherein in that
    the front panel (9) is arranged parallel to and spaced from the front wall (4) to divide an interior area of the body (1) into a main compartment (12) and a front compartment (13),
    the cardboard blank (28) is severed in a region of one of said two side panels (10) and part of the front panel (9) of the collar (11) such that the main compartment (12) of the body (1) is subdivided into the two receiving compartments (15) by a boundary wall (14) extending from the front panel (9) to the rear wall (5), and the front wall (4) comprises a slot (23) extending from an upper free edge of the front wall (4) as a means of entry into the front compartment (13).

2. The folding box according to claim 1, characterised in that the front panel (9) comprises a slot (24) as a means of entry into the front compartment (13).

3. The folding box according to claim 1, characterised in that an intermediate base (17) is inserted in one of the receiving compartments (15).

4. The folding box according to claim 3, characterised in that the cardboard blank (28) comprises, for forming the intermediate base (17), a tongue (16) extending from the underside of the side panel (10) hinged to the rear wall (5) via a fold line (31).

5. The folding box according to claim 4, characterised in that the tongue (16) in a first portion (39) extends away from the side panel (10), in a second portion (42) extends in the direction of the free upper edge of the side panel, and in a third portion (66) is guided to the side panel, the third portion (66) terminating in a fourth portion (44) extending parallel to the side panel (10) and glued thereto.

6. The folding box according to claim 1, characterised in that an information leaflet is removably inserted in at least one of the front compartment (13) and one of the receiving compartments (15) of the main compartment (12).

7. The folding box according to claim 6, characterised in that an information leaflet is removably secured in the front compartment (13).

8. The folding box according to claim 7, characterised in that the information leaflet is inserted in a sleeve (21) which is glued to the inside of the front wall (4) or the outside of the front panel (9) of the collar (11).

9. The folding box according to claim 1, characterised in that an applicator device, for a medical active substance formulation is inserted in one receiving compartment (15) of the main compartment (12) and at least one package, containing the active substance formulation that is to be administered is inserted in the other receiving compartment (15).

10. The folding box according to claim 1, characterised in that the hinged lid (7) is connected to the side walls (3) and the front wall (4) along a fold line that can be broken open when the hinged lid (7) is opened for the first time.

* * * * *